Figure 13:
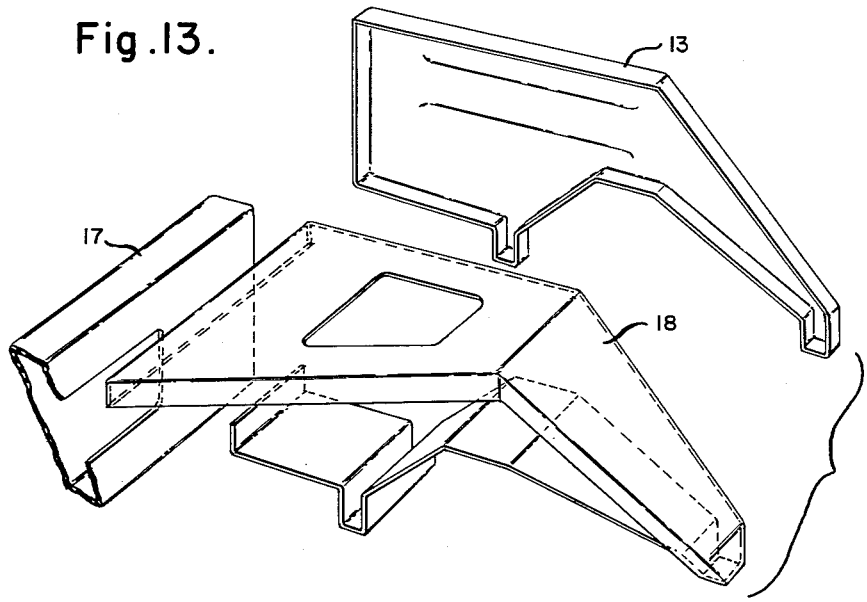

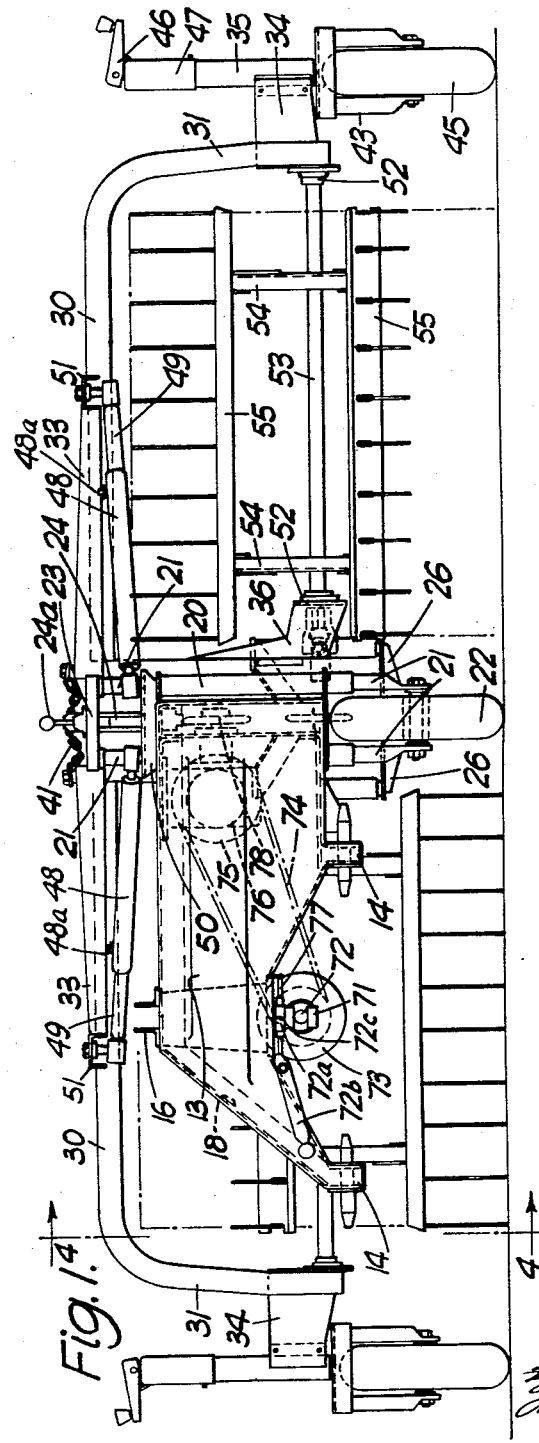

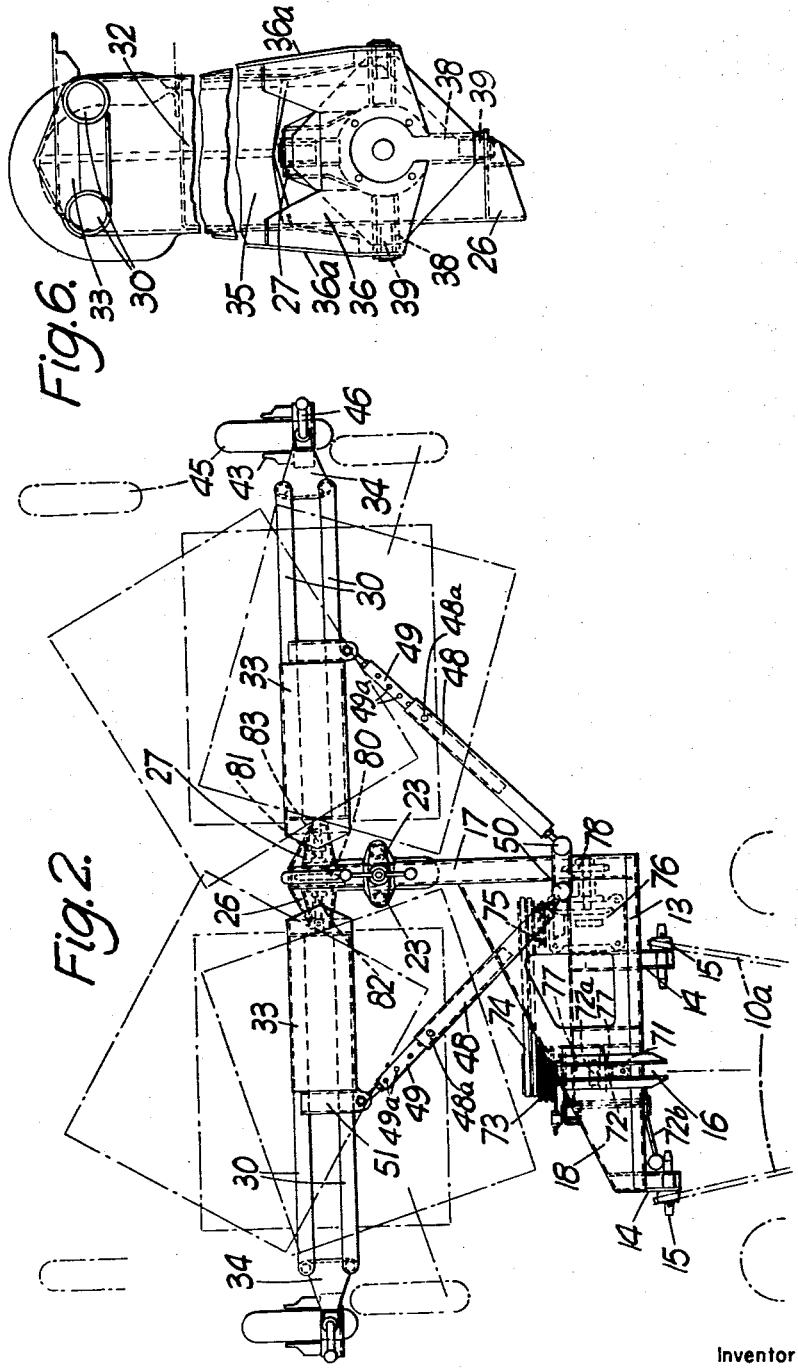

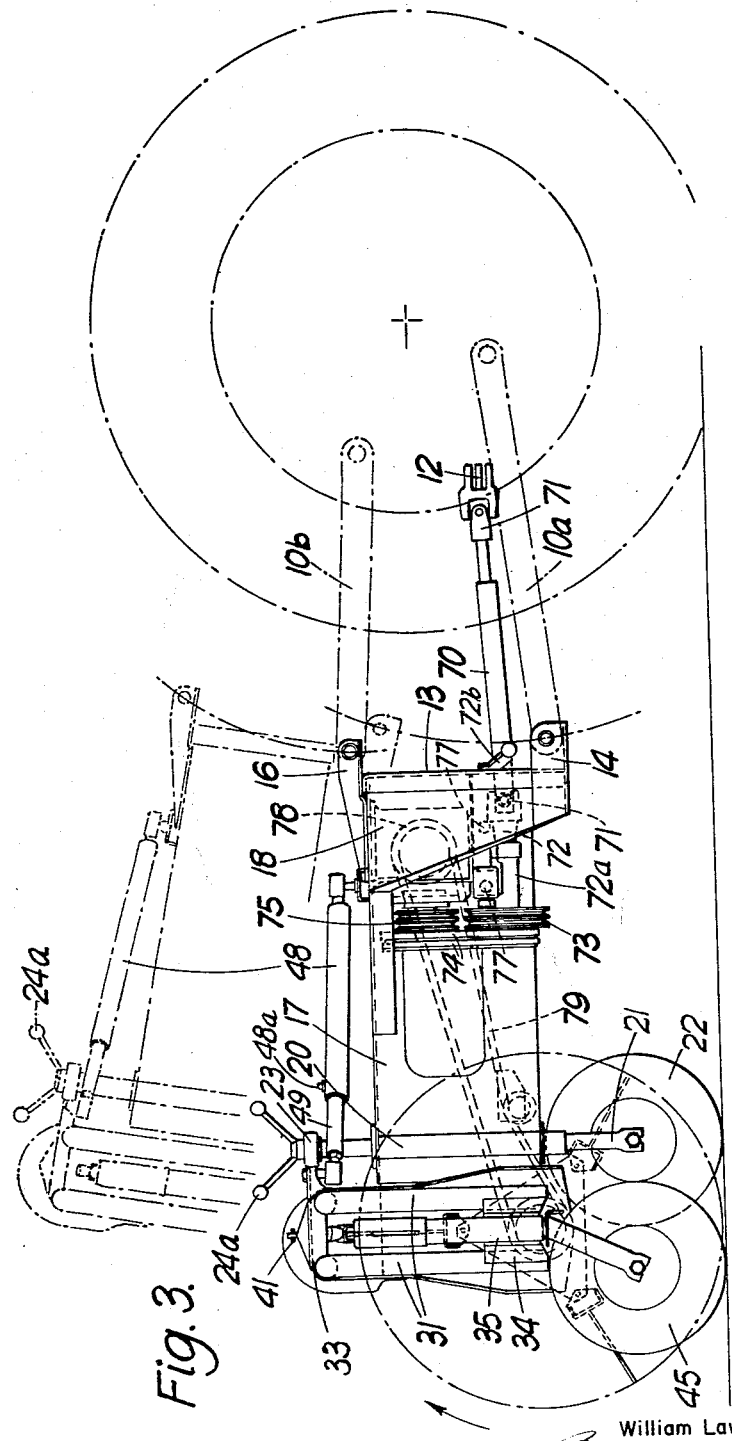

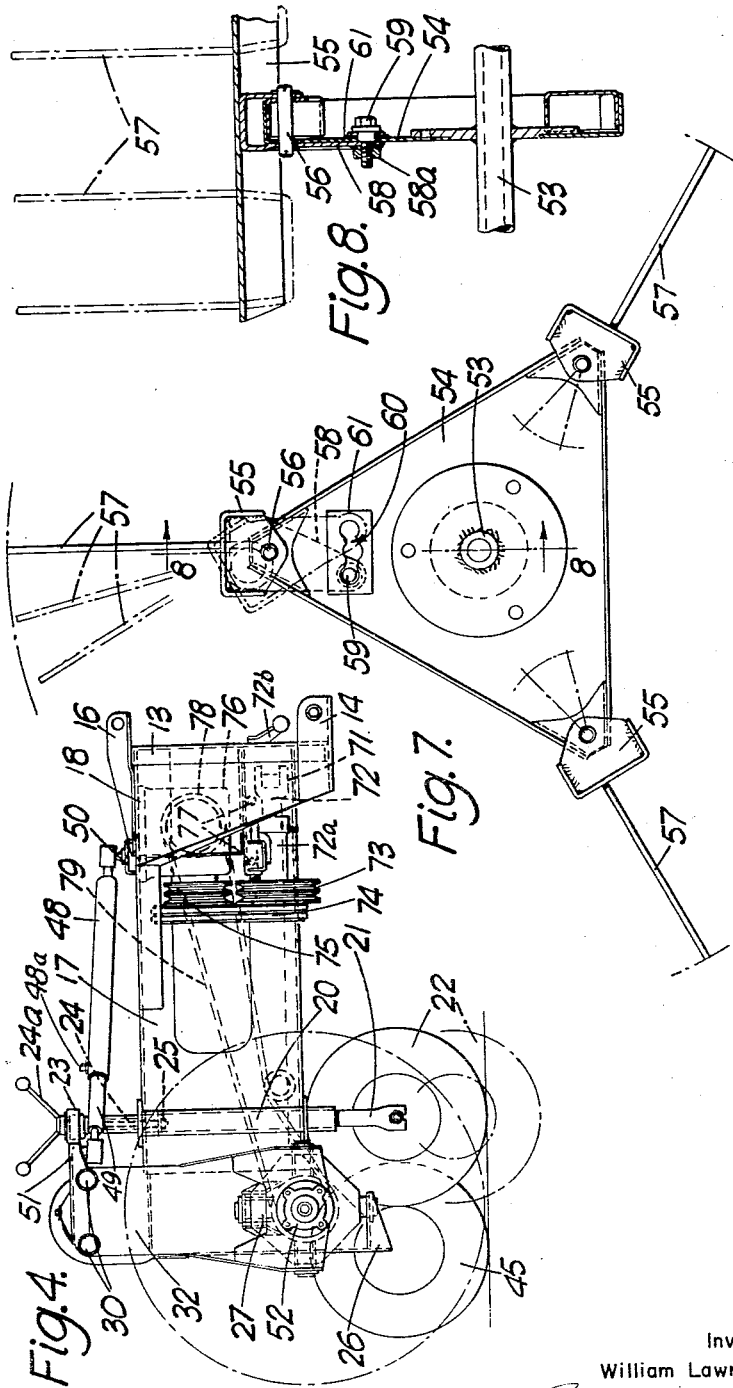

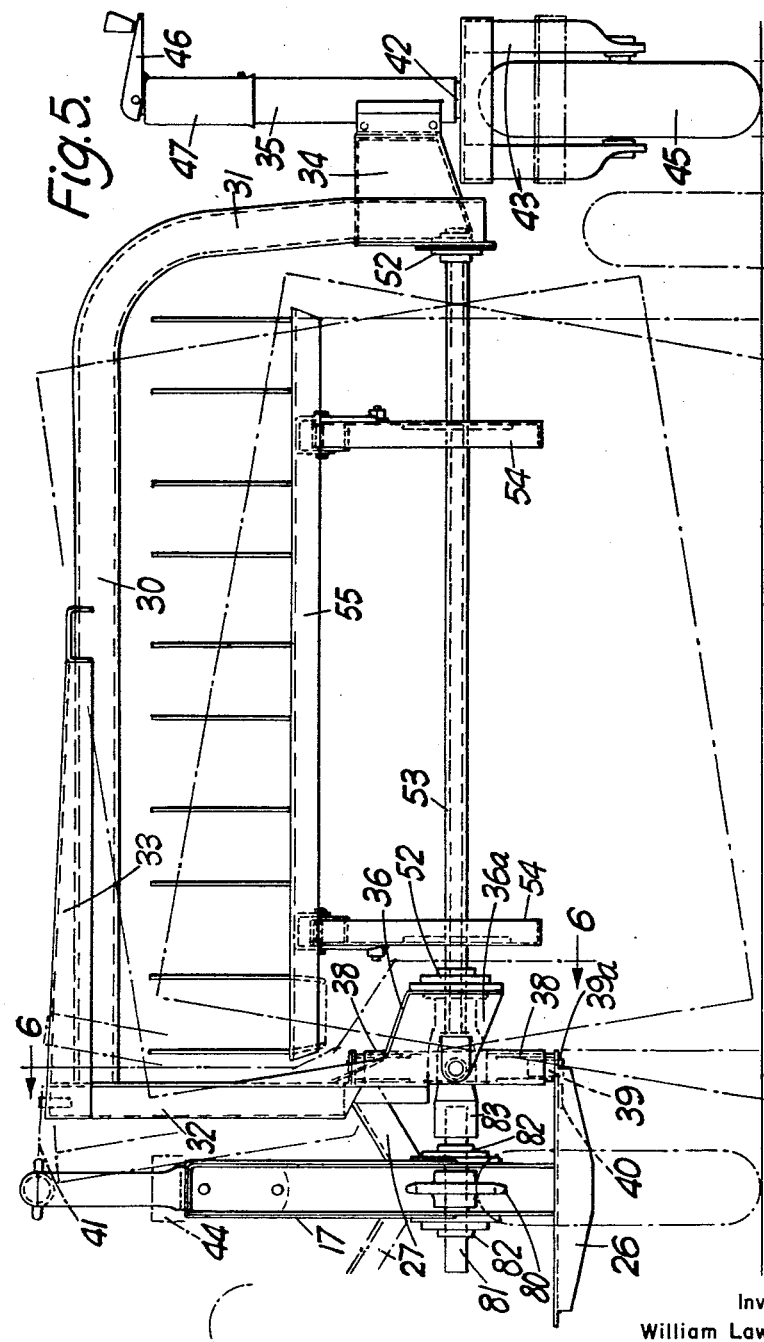

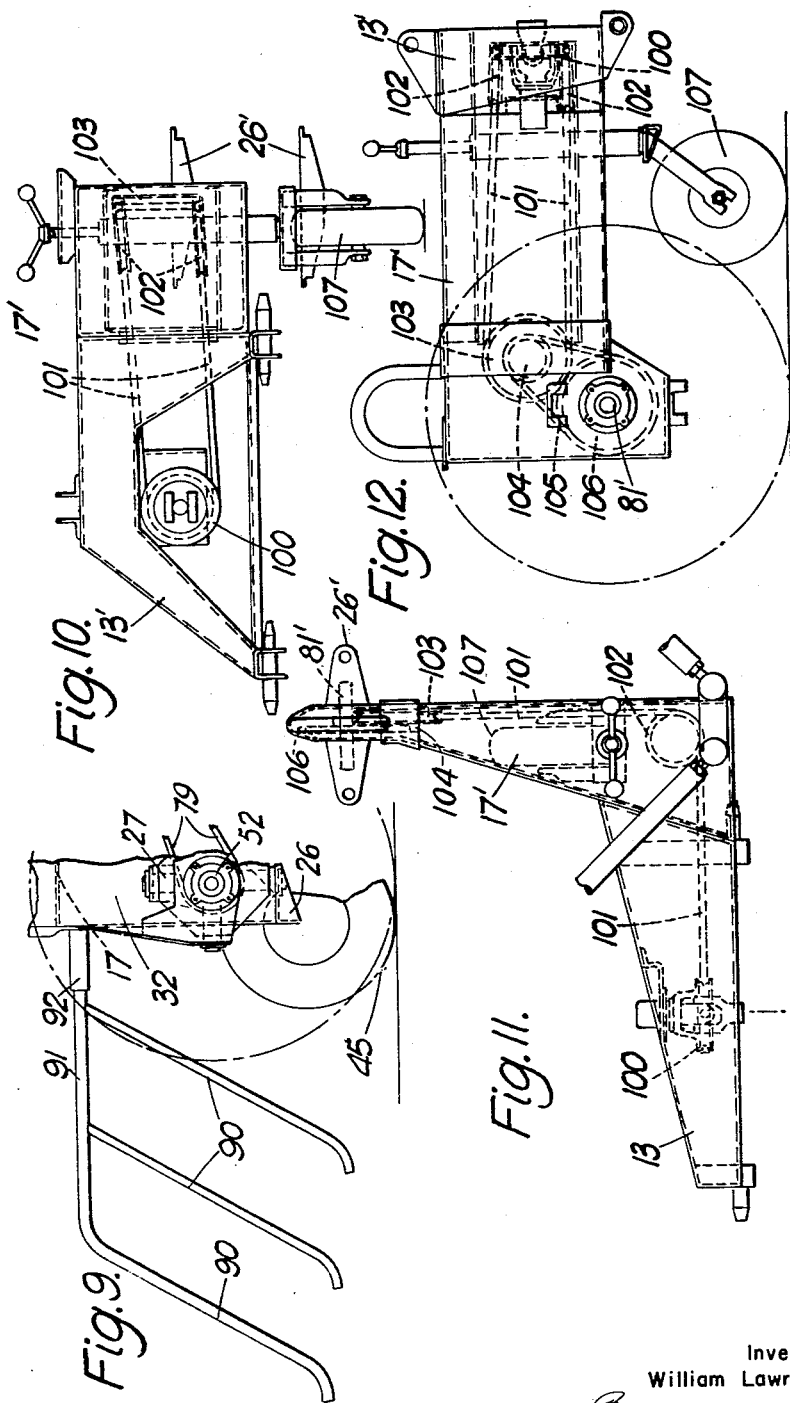

Aug. 11, 1964 W. L. SAVAGE 3,143,846
AGRICULTURAL APPARATUS INCLUDING ROTARY TINE-CARRYING MEMBERS
Filed Nov. 28, 1962 7 Sheets-Sheet 7

INVENTOR
William Lawrence Savage

United States Patent Office 3,143,846
Patented Aug. 11, 1964

3,143,846
AGRICULTURAL APPARATUS INCLUDING
ROTARY TINE-CARRYING MEMBERS
William Lawrence Savage, Stamford, England, assignor to
Blackstone & Company Limited, Stamford, England,
a British company
Filed Nov. 28, 1962, Ser. No. 240,487
Claims priority, application Great Britain Nov. 28, 1961
10 Claims. (Cl. 56—366)

This invention comprises improvements in or relating to agricultural apparatus for tedding, windrowing, splitting a windrow, side-delivery raking and like operations capable of being operated by connection to the rear hitch links of an agricultural tractor.

According to the present invention, agricultural apparatus for tedding, windrowing, splitting a windrow, side-delviery raking and like operations, comprises a main frame adapted for connection to hitch links of a tractor, a pair of tine drums supported one on each side of the main frame through means permitting the drums to move independently relative to the main frame, and a drive arrangement permitting the drums to be driven from a power take off of the tractor.

Preferably, each tine drum is rotatively carried by an arch frame extending laterally from the main frame, the arch frame being connected at one end to the main frame through a connection permitting vertical swinging of the arch frame, and the arch frame carrying at its other end a support wheel which is preferably a castor wheel. Preferably also the connection between the arch frame and the main frame permits horizontal swinging of the arch frame relative to the main frame so that the disposition of the tine drum relative to the main frame may be adjusted, and means is provided to locate the arch frame in the selected disposition. This means may comprise a telescopic strut permitting its length to be adjusted, the strut being connected at its ends to the main frame and the arch frame through universal joints.

In one particular construction according to the above features of invention, the connection permitting movement of the arch frame relative to the main frame comprises a cross member which has a first pair of oppositely extending arms pivoted to the main frame and a second pair of oppositely extending arms, which are at right angles to the first pair, pivoted to the arch frame.

According to a feature of this invention, the main frame may comprise a front frame having connection points for the hitch links and a backbone structure extending rearwards from the front frame, the backbone structure having a supporting wheel towards its rear end and having the tine drums supported from it at this end, the drive arrangement including parts housed within the backbone structure. The final element of the drive may be a short shaft mounted with its ends projecting one on each side of the backbone structure and connected by universal couplings to the respective tine drums. In one particular form, the drive comprises a pulley which is mounted below the main frame and connectible to a power take-off of a tractor, a belt drive from the pulley to drive transmitting members housed in the backbone structure, said drive transmitting members including a chain drive to the short shaft at the rear of the backbone structure. The belt drive may be arranged to permit changes of speed ratio to be made, and the pulley may be carried on rails permitting adjustment of its position.

Figure 14:
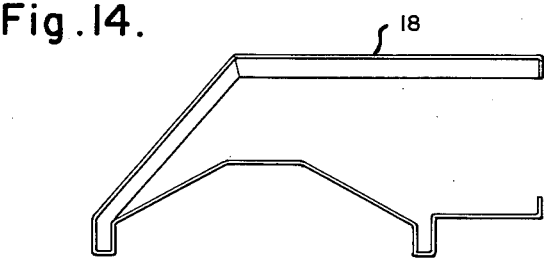

Apparatus embodying the above and other features of invention will now be described by way of example, the description referring to the accompanying drawings, in which:

FIGURE 1 is a front elevation of the apparatus,

FIGURE 2 is a plan view, the tine drums being omitted,
FIGURE 3 is a side elevation of FIGURE 2,
FIGURE 4 is a section on the line 4—4 of FIGURE 1, the tine drums being omitted,
FIGURE 5 is a detail view of part of the tedder,
FIGURE 6 is a section on the line 6—6 of FIGURE 6,
FIGURE 7 is a detail view of the tine drum,
FIGURE 8 is a section on the line 8—8 of FIGURE 8,
FIGURE 9 illustrates an additional feature,
FIGURE 10 is a front elevation of part of the apparatus showing an alternative form of drive,
FIGURE 11 is a plan view of FIGURE 10,
FIGURE 12 is a side elevation of FIGURE 10,
FIGURE 13 is an exploded isometric view of a fragment of the backbone structure and the front frame member and frame plate member, and
FIGURE 14 is an end elevational view of the frame plate member.

The apparatus shown is suitable for tedding, windrowing, splitting a windrow, and side-delivery raking and comprises a main frame which can be secured to the hitch links 10a, 10b of a tractor, independently movable tine-drum-carrying arch frames, and means to drive the tine drums from the power take-off shaft 12 of the tractor.

The main frame (FIGURES 1 to 4) comprises a front frame 13 carrying a pair of lower lugs 14 for attachment to the lower hitch links 10a by pins 15 and an upper bifurcated lug 16 for attachment to the upper hitch links 10b, and a backbone structure 17 which extends rearwards from one end of the front frame 13 but centrally of the apparatus and is rigidly secured thereto through frame plates 18. Near its rear end, that is its end remote from the front frame 13, the backbone structure 17 has secured on each side of it a pair of tubes 20 in which slide fork tubes 21 for a centre wheel 22 disposed below the backbone structure 17. At their upper ends, the fork tubes 21 are connected by a bridge piece 23 carrying a screwed spindle 24 which can be rotated by handle 24a. The screwed spindle 24 engages a nut member 25 (FIGURE 4) mounted in the backbone structure 17, so that by rotating the spindle 24 by handle 24a the centre wheel 22 may be raised or lowered with respect to the backbone structure 17. The centre wheel 22 supports the rear end of the main frame in operation.

At its rear end, the backbone structure 17 has rigidly secured to it two pairs of vertically-spaced lugs 26, 27, one pair projecting laterally from one side of the backbone structure 17 and the other pair projecting from the other side.

The lugs 26, 27 provide primary supports for the two tine-drum-carrying arch frames, one on each side of the backbone structure 17.

Each tine-drum-carrying frame (FIGURES 1 to 6) comprises a pair of parallel tubes 30 with downturned portions 31 at one end, which tubes are secured together at their ends nearer the backbone structure 17 by a vertical plate 32 and a top plate 33, and at the lower ends of the downturned portions 31 by a bracket 34 to which is secured a vertically-extending tube 35. The plate 32 has secured on its lower end a bracket 36 having fore and aft space flanges 36a (FIGURES 5 and 6).

A cross member 38 (FIGURES 5 and 6), each arm of which houses in its end a bearing bush, is disposed with one pair of arms extending vertically between the pair of lugs 26, 27 and the other pair of arms extending horizontally between the flanges 36a. Flange-headed pivot pins 39 extend through the lugs and flanges into the bushes in the arms of the cross member 38, so supporting the arch frame for universal movement relative to the main frame. The flange heads 39a of the pins are locked by set screws 40 to the lugs 26, 27 and flanges 36a respectively. Upward swinging of the frame is limited by a rubber buffer 44 on the backbone structure 17 and downward swinging is limited by a chain 41 (FIGURE 5), the effective length of which may be adjusted.

The tube 35 at the outer end of the arch frame slidingly receives the head tube 42 of a fork 43 carrying a castor wheel 45. The fork 43 may be raised or lowered by rotating handle 46 which drives a threaded spindle housed in the tube 35, and the handle 46 may be locked by depressing a spring-loaded cap 47 to engage a catch. The castor wheel 45 supports the outer end of the arch frame.

The angle which the tine-drum-carrying frame makes to the fore and aft direction is determined by a telescopic strut 48, 49 (FIGURES 1 to 4) the parts of which can be locked together after adjustment of the length of the strut by a pin 48a passing through holes 49a in the parts, as best shown in FIGURE 2. The ends of the struts 48, 49 are connected by universal joints, for example ball joints, to brackets 50, 51 on the backbone structure 17 and on the tubes 30 respectively. A number of possible positions of adjustment of the tine drums are shown in chain lines in FIGURE 2.

The brackets 36 and 34 of the arch frame support self-aligning bearings 52 in which a shaft 53 of the tine drum is journalled. The shaft 53 (FIGURES 1, 5, 7 and 8) has secured to it a pair of triangular plates 54 to which near their vertices the channel-section bars 55 are pivoted by pins 56. Each bar 55 carries a row of spring tines 57 and has an inwardly projecting arm 58 with a threaded boss 58a (FIGURE 8) at its end for receiving a set screw 59 which also passes through one of a number of enlargements of a slot 60 formed in a patch plate 61 welded to the triangular plate 54. This arrangement permits the angle of the tines 57 to be altered for example as indicated at the top of FIGURE 7. The axis of shaft 53 passes through the centre of the cross-member 38.

The tine drums are driven from the power-take-off shaft 12. The shaft 12 (FIGURES 1 to 5) is connected by a telescopic shaft 70 having universal joints 71 at each end to a lay-shaft 72 mounted below the front frame 16. The lay-shaft 72 carries a pulley 73 for a V-belt 74 which also runs over a pulley 75 carried by an input shaft of a bevel gearbox 76 mounted in the main frame. The pulleys 73, 75 are multigrooved to allow speed changes and the lay-shaft 72 is carried by a mounting 72a slidably disposed on rails 77 (FIGURE 1) which allows its position to be adjusted to take up slack in belt 74 by simply loosening a set screw 72c, pivoting lever 72b (swingably mounted on frame plate 18) to shift lay-shaft 72 and take up the slack in belt 74, and then tightening set screw 72c.

The gear box output shaft carries a sprocket 78 driving a chain 79 which in turn drives a sprocket 80 at the rear end of the backbone structure 17. The sprockets 78, 80 and chain are enclosed within the structure 17. The sprocket 80 is carried on a short cross-shaft 81 mounted in bearings 82 in the backbone structure 17, the ends of the cross-shaft being connected by universal driving couplings 83 to the adjacent ends of the two shafts 53 to drive them.

It will be understood that since the two arch frames carrying the tine drums are independently mounted on the main frame through a universal connection and the tine drums themselves have independent drives from the main frame through universal couplings, the apparatus is readily operable on unlevel ground and the tine drums can be independently adjusted as to their positions relative to the main frame so allowing a wide variety of operations to be carried out readily. The apparatus can be easily set by adjusting struts 48, 49 for example for tedding two swaths, for collecting two swaths into one, for splitting a swath and for tedding on to dry ground.

Referring now to FIGURE 9, there is shown a central swath divider which may be used with the apparatus.

The swath divider comprises a series of spaced prongs 90 extending downwardly and rearwardly from a support bar 91 detachably mounted in socket 92 on the backbone structure 17, the prongs 90 having their lower ends bent to project rearwardly.

Referring now to FIGURES 10 to 12, there is shown an alternative form of drive for the tine drums, in which structure corresponding to the structure shown and described in the first described embodiment carry like reference numerals with a prime sign added thereto. In this case the power-take-off shaft drives a recessed pulley wheel 100 rotatively supported below the front frame 13'. A belt 101 runs from this pulley over two idler pulleys 102, which are disposed one above the other at the junction of the front frame 13' and the backbone structure 17', the planes of the pulleys 102 being at right angles to that of the pulley 100, and then over a pulley 103 disposed within the backbone structure 17' near its rear end, the pulley 103 having its axis parallel to that of the cross shaft 81'. The pulley 103 has a sprocket 104 secured to it and a chain 105 connects this sprocket to a sprocket 106 on the cross shaft 81'. The shaft 81' is connected to the tine drums as described with reference to FIGURES 1 to 8.

In this construction moreover the centre wheel is a castor wheel 107 and it is positioned sufficiently far forwardly of the tine drums so as not to foul them in operation.

It will be clear that in the constructions above described the tine drums may be arranged to be driven in either direction.

I claim:

1. For use with a tractor vehicle having hitch links and a power take-off, agricultural apparatus for tedding, windrowing, splitting a windrow, side-delivery raking and like operations comprising, (a) a main frame adapted for mounting on said hitch links;

(b) a pair of arch frames, each said arch frame having,
   (b1) a universal connection connecting the arch frame at one end to said main frame, whereby said arch frames are capable of independent movement relative to the main frame, and
   (b2) a ground-engaging wheel at its other end;

(c) a pair of rotary members, one associated with each arch frame, each said rotary member having,
   (c1) a shaft rotatively supported in the associated arch frame with one end adjacent said universal connection and with its other end adjacent the ground-engaging wheel, the axis of the shaft passing through the centre of said universal connection,
   (c2) a plurality of tines mounted on said shaft in rows parallel to said shaft and extending outwardly from said shaft;

(d) separate adjustable means for each arch frame connecting the arch frame to the main frame, adjustment of said adjustable means varying the position of the arch frame and its associated rotary member relative to the main frame; and (e) driving means for the rotary members, said driving means including
   (e1) a rotatable input member mounted on the main frame adapted for connection to the power-take-off of the tractor vehicle,
   (e2) a cross shaft mounted in the main frame and having its ends projecting therefrom adjacent the universal connections of the arch frames respectively,
   (e3) a drive transmission housed at least in part within the main frame and drivingly connecting the input member and the cross-shaft, and
   (e4) universal couplings drivingly connecting the ends of the cross-shaft respectively to the adjacent ends of the shafts of the pair of rotary members.

2. Agricultural apparatus according to claim 1 wherein the universal connection permitting movement of the arch frame relative to the main frame comprises a cross member having a first pair of oppositely and vertically extending arms and a second pair of oppositely and horizontally extending arms, a pair of vertically spaced lugs on the main frame, said first pair of arms being pivoted at their ends to the lugs to rotate about a vertical axis, and a horizontally spaced pair of flanges on the arch frame, said second pair of arms being pivoted at their ends to said flanges to rotate about a horizontal axis.

3. Agricultural apparatus according to claim 2, comprising means limiting swinging of the arch frame about said horizontal axis.

4. Agricultural apparatus according to claim 3, said means including a buffer limiting upward swinging of the arch frame.

5. Agricultural apparatus according to claim 3, said means including a chain connecting the arch frame and the main frame to limit downward swinging of the arch frame about said horizontal axis.

6. Agricultural apparatus according to claim 1, said separate adjustable means including, for each arch frame, a corresponding telescopically adjustable strut, and universal joints connecting the ends of the strut to the main frame and its associated arch frame respectively.

7. Agricultural apparatus according to claim 1, the main frame comprising a front frame having connection points for the hitch links and a backbone structure extending rearwards from the front frame, a support wheel mounted on the backbone structure towards its rear end, having the said universal connections connected thereto at this end, and said cross shaft being mounted in the backbone structure at the said end.

8. Agricultural apparatus according to claim 7, wherein the drive transmission comprises a pulley which is mounted below the main frame and is connectible to a power-take-off of a tractor, a chain drive housing within said backbone structure and driving said cross-shaft, and a belt transmitting a drive from the pulley to the chain drive.

9. Agricultural apparatus according to claim 1, comprising also a central swath divider mounted on the main frame and projecting rearwards of the tine drums.

10. Agricultural apparatus according to claim 9, the swath divider comprising a series of spaced prongs extending downwardly and rearwardly from a support bar mounted on the main frame.

References Cited in the file of this patent
UNITED STATES PATENTS
2,929,187    Boggio _____ Mar. 22, 1960